(12) United States Patent
Chen et al.

(10) Patent No.: US 8,714,691 B2
(45) Date of Patent: May 6, 2014

(54) DETECTING STRETCH OR SHRINK IN PRINT MEDIA

(75) Inventors: Samuel Chen, Penfield, NY (US); Mark C. Rzadca, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/481,986

(22) Filed: May 29, 2012

(65) Prior Publication Data

US 2013/0321513 A1    Dec. 5, 2013

(51) Int. Cl.
*B41J 29/393*    (2006.01)
*B41J 2/21*    (2006.01)
*B41J 11/00*    (2006.01)

(52) U.S. Cl.
CPC .............. *B41J 29/393* (2013.01); *B41J 2/2135* (2013.01); *B41J 11/009* (2013.01)
USPC .......................................................... 347/19

(58) Field of Classification Search
CPC ............ B41J 29/38; B41J 3/28; B41J 29/393; B41J 2/2135; B41J 11/009
USPC ................. 347/14–16, 19, 101, 104
See application file for complete search history.

(56) References Cited

U.S. PATENT DOCUMENTS

| | | | |
|---|---|---|---|
| 6,118,132 A | 9/2000 | Tullis | |
| 7,032,518 B2 * | 4/2006 | Scheffer et al. | 101/485 |
| 7,878,617 B2 | 2/2011 | Mizes et al. | |
| 2002/0084648 A1 | 7/2002 | Pierce et al. | |
| 2010/0043859 A1 | 2/2010 | Aranami et al. | |

\* cited by examiner

*Primary Examiner* — An Do
(74) *Attorney, Agent, or Firm* — Nancy R. Simon; Amit Singhal

(57) ABSTRACT

A printing system includes a print media and one or more non-objectionable test patterns formed or printed on the print media. An integrated imaging system captures images of the one or more non-objectionable test patterns. The integrated imaging system includes a housing, an opening in the housing for receiving light reflected from a moving print media, a folded optical assembly in the housing that receives the reflected light and transmits the light a predetermined distance, and an image sensor within the housing that receives the light and captures one or more images of the one or more non-objectionable test patterns. A processing device can process the one or more images to determine if one or more size variations have occurred in the print media.

8 Claims, 10 Drawing Sheets

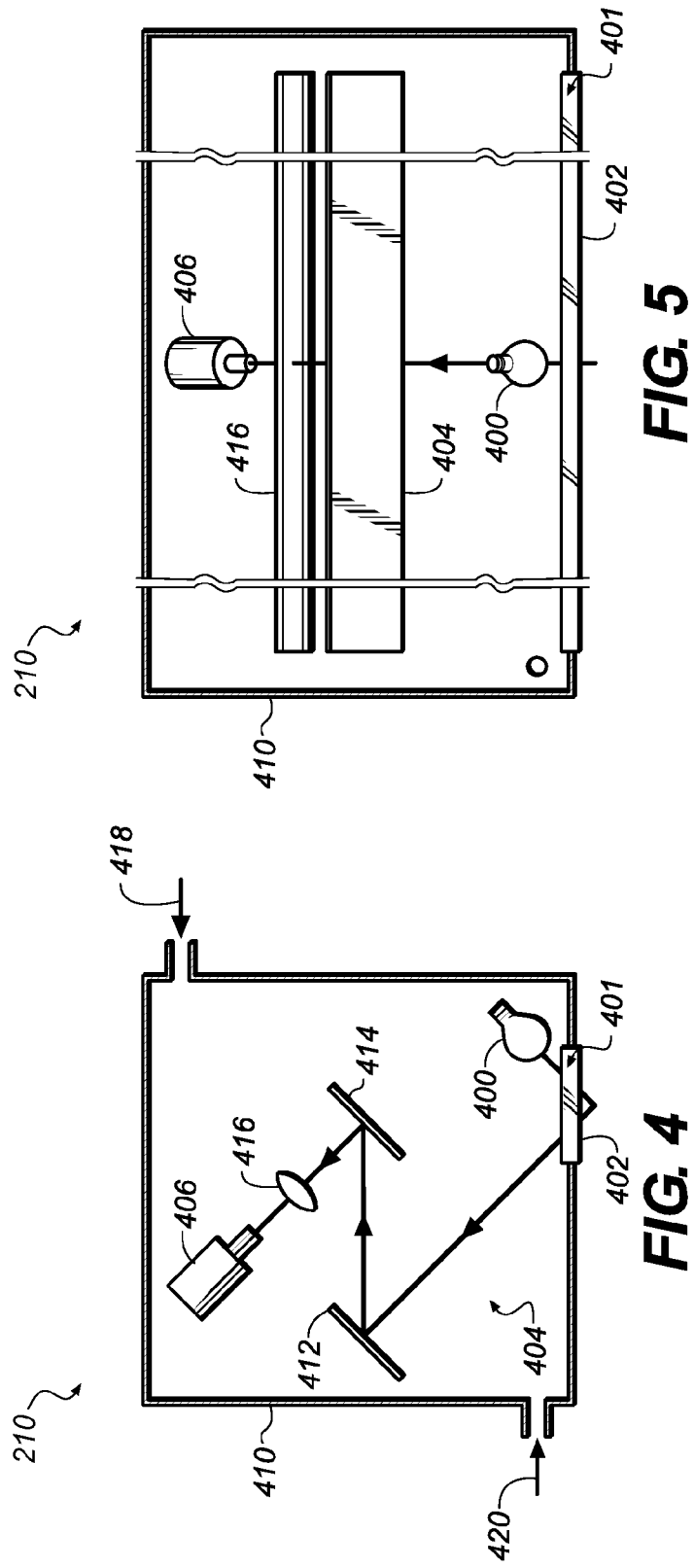

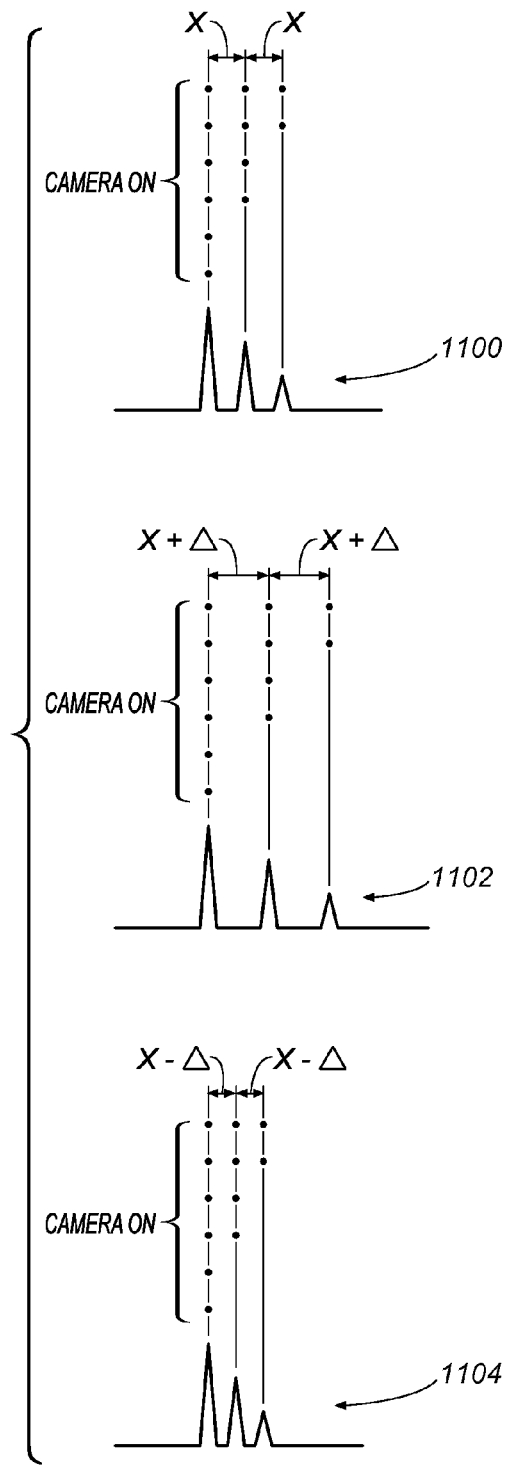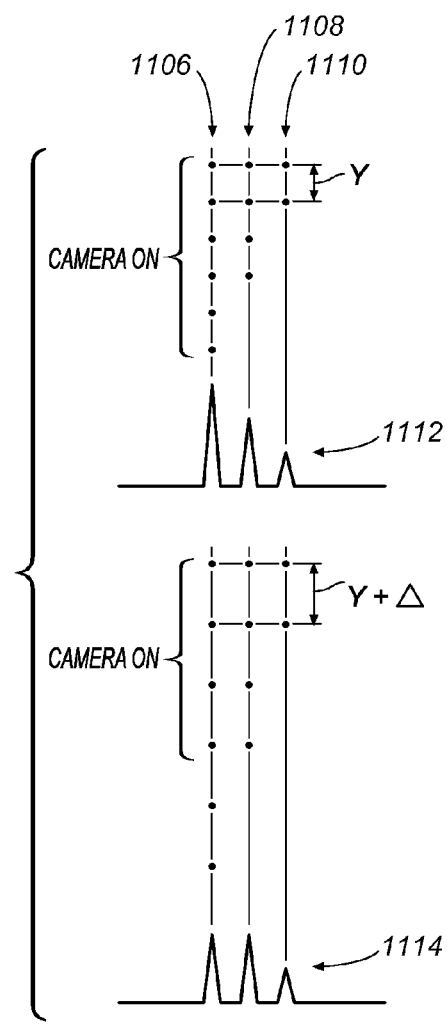
FIG. 11B     FIG. 11C

DETECTING STRETCH OR SHRINK IN PRINT MEDIA

CROSS REFERENCE TO RELATED APPLICATIONS

Reference is made to commonly-assigned, U.S. patent application Ser. No. 13/481,984, entitled "DETECTING STRETCH OR SHRINK IN PRINT MEDIA", filed concurrently herewith.

TECHNICAL FIELD

The present invention relates generally to printing systems and more particularly to the detection of stretch or shrink in a print media moving through a printing system.

BACKGROUND

In commercial inkjet printing systems, a print media is physically transported through the printing system at a high rate of speed. For example, the print media can travel 650-1000 feet per minute. A commercial inkjet printing system can include multiple lineheads, with each linehead having one or more printheads. The printheads typically include multiple nozzle plates, with each nozzle plate having precisely spaced and sized nozzles. The cross-track pitch, measured as drops per inch or dpi, is determined by the nozzle spacing. The dpi can be as high as 600, 900, or 1200 dpi.

The print media can receive a large amount of ink during printing, especially with water-based ink or in high ink laydown regions of the printed content (e.g. a picture with a lot of dense black background). In turn, the aqueous component of the ink is absorbed into the print media and can cause the print media to swell and stretch, especially if the print media is under tension. Stretch is usually significantly higher in the direction of movement (i.e., the in-track direction) than in the cross-track direction.

Additionally, heat is typically applied at one or more locations in a printing system to dry the ink that has been applied to the print media. Drying of the print media can cause the print media to shrink. When the print media is heated in between lineheads, regions of the print media can be stretched and shrunk one or more times as the print media moves through a printing system.

Printing with several color planes in which each color record is printed sequentially requires color laydown correlation. Unanticipated or unaccounted for stretch or shrink in the print media can cause a loss of color correlation and can lead to blurry content or hue degradation. Additionally, printing on both sides of the print media usually requires front-to-back registration, and the second side of the print media is usually printed significantly later than the first side.

Visible patterns such as dots, lines and polygons are typically printed on the print media so that a high speed and high magnification camera can record the pattern to determine if there are deviations from a reference value. If there are deviations, in-track and cross-track compensation values can be calculated and used to adjust the position or speed of the print media or of the drops of ink. Such cameras are often costly and dedicated for imaging the visible patterns. The cameras are usually kept stationary to monitor for the dots, lines and polygon patterns, and can monitor only a limited portion of the print media. If more visible patterns are printed than there are cameras, the extra patterns are either ignored or the cameras are moved to different positions to analyze all of the patterns. Moreover, the visible patterns of dots, lines or polygons are usually large (millimeter to centimeter in size) and printed on the edges of the print media or the edges of the printed content. The printed visible patterns must be trimmed away before the printed content is assembled into a final product, such as a magazine or book.

SUMMARY

In one aspect, a print media in a printing system includes multiple test patterns with each test pattern having one or more marks. Each test pattern can also have a different number of marks than the number of marks in the other test patterns. A method for detecting size variations in the print media while the print media is moving through the printing system includes (a) scanning the test patterns as the print media is moving in a transport direction to produce test pattern signals, with each signal representing a respective test pattern; (b) analyzing the measured test pattern signals to determine whether a size variation has occurred in the print media; (c) determining one or more compensation values based on the size variation; and (d) if a size variation is detected, adjusting the operation or setting of one or more components in the printing system based on the one or more compensation values. The size variation in the print media can be stretch or shrink.

In another aspect, prior to performing (c), a determination can be made as to whether or not the size variation equals or exceeds a threshold value. One or more compensation values based on the size variation is determined only if the size variation equals or exceeds the threshold value.

In another aspect, the test patterns can be implemented as non-objectionable test patterns. The non-objectionable test patterns can be formed in the margin surrounding the content area, within the content area, or both in the margin and the content area.

In another aspect, a printing system can include a print media; one or more non-objectionable test patterns formed or printed on the print media; and an integrated imaging system that includes a housing; an opening in the housing for receiving light reflected from a moving print media; a folded optical assembly in the housing that receives the reflected light and transmits the light a predetermined distance; and an image sensor within the housing that receives the light and captures one or more images of the non-objectionable test pattern.

In another aspect, the printing system can include an image processing device that is connected to the integrated imaging system for analyzing the test pattern signals to detect size variations in the print media.

In another aspect, a storage device can be connected to the image processing device for storing reference test pattern signals. The reference test pattern signals can be compared with the measured test pattern signals to determine whether a size variation has occurred in the print media.

BRIEF DESCRIPTION OF THE DRAWINGS

Embodiments of the invention are better understood with reference to the following drawings. The elements of the drawings are not necessarily to scale relative to each other.

FIG. 4 is a cross-sectional view along line 4-4 in FIG. 3 in an embodiment in accordance with the invention;

FIG. 5 is a cross-sectional view along line 5-5 in FIG. 3 in an embodiment in accordance with the invention;

FIGS. 11A-11C depict examples of test patterns on a print media and reference and measured signals in an embodiment in accordance with the invention.

DETAILED DESCRIPTION

Figure 1:
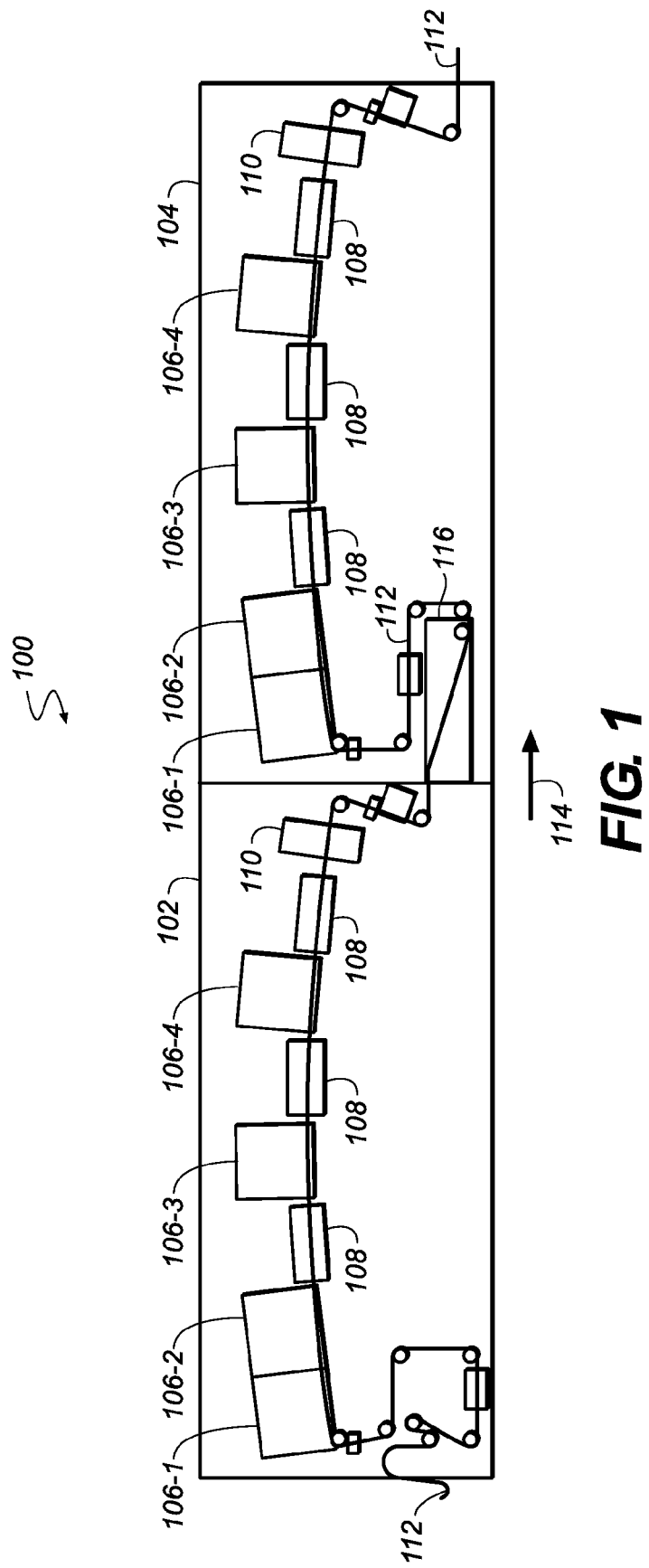
FIG. 1 illustrates one example of an inkjet printing system for continuous web printing on a print media.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper. However, there are numerous other materials in which inkjet is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the term printhead, as used herein, is intended to be generic and not specific to either technology. Additionally, the invention described herein is applicable to both types of print media. As such, the term print media, as used herein, is intended to be generic and not as specific to either type of print media or the way in which the print media is moved through the printing system.

The terms "upstream" and "downstream" are terms of art referring to relative positions along the transport path of the print media; points on the transport path move from upstream to downstream. In FIGS. 1, 2, 6, 10 and 11A the print media moves in the direction as indicated by transport direction arrow 114. Where they are used, terms such as "first", "second", and so on, do not necessarily denote any ordinal or priority relation, but are simply used to more clearly distinguish one element from another.

Referring now to the schematic side view of FIG. 1, there is shown one example of an inkjet printing system for continuous web printing on a print media. Printing system 100 includes a first printing module 102 and a second printing module 104, each of which includes lineheads 106, dryers 108, and a quality control sensor 110. Each linehead 106 typically includes multiple printheads (not shown) that apply ink or another liquid to the surface of the print media 112 that is adjacent to the printheads. For descriptive purposes only, the lineheads 106 are labeled a first linehead 106-1, a second linehead 106-2, a third linehead 106-3, and a fourth linehead 106-4. In the illustrated embodiment, each linehead 106-1, 106-2, 106-3, 106-4 applies a different colored ink to the surface of the print media 112 that is adjacent to the lineheads. By way of example only, linehead 106-1 can apply cyan colored ink, linehead 106-2 magenta colored ink, linehead 106-3 yellow colored ink, and linehead 106-4 black colored ink.

The first printing module 102 and the second printing module 104 also include a web tension system that serves to physically move the print media 112 through the printing system 100 in the transport direction 114 (left to right as shown in the figure). The print media 112 enters the first printing module 102 from a source roll (not shown) and the linehead(s) 106 of the first module applies ink to one side of the print media 112. As the print media 112 feeds into the second printing module 104, a turnover module 116 is adapted to invert or turn over the print media 112 so that the linehead(s) 106 of the second printing module 104 can apply ink to the other side of the print media 112. The print media 112 then exits the second printing module 104 and is collected by a print media receiving unit (not shown).

Figure 2:
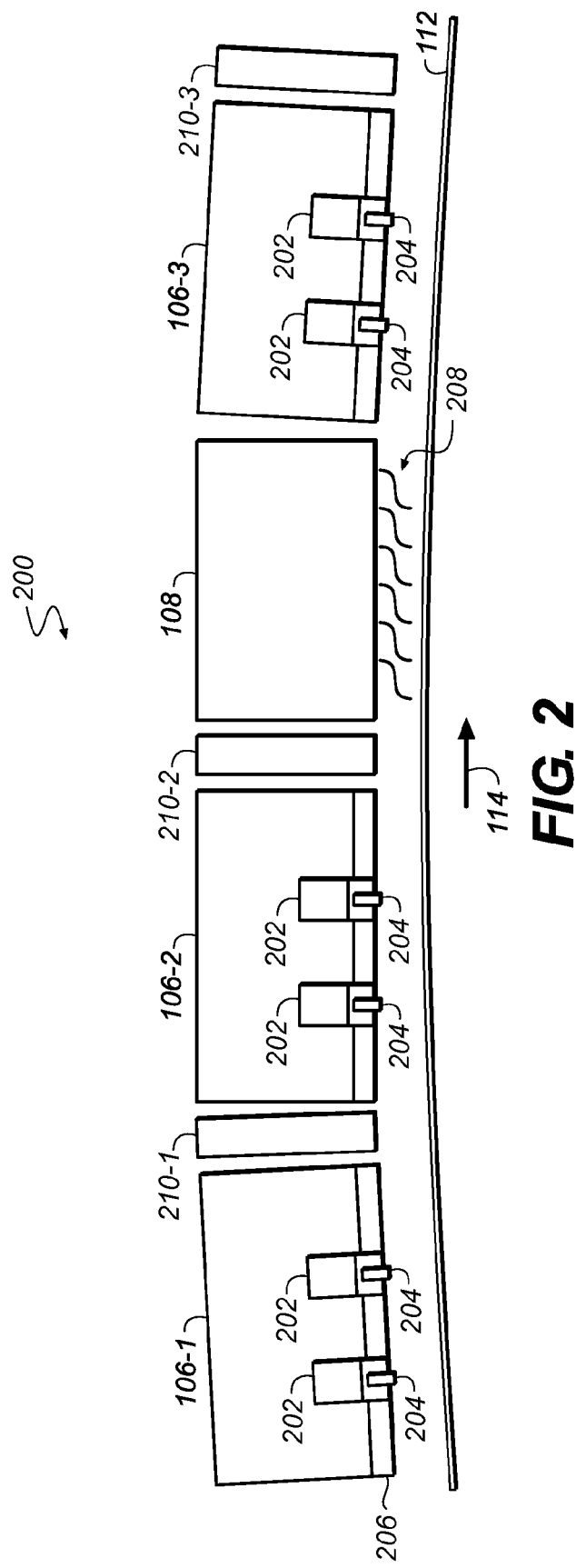
FIG. 2 depicts an example of a portion of a printing system in an embodiment in accordance with the invention.

FIG. 2 depicts an example of a portion of a printing system in an embodiment in accordance with the invention. As the print media 112 is directed through printing system 200, the lineheads 106, which typically include one or more printheads 202, apply ink or another liquid onto the print media 112 via the nozzle arrays 204 of the printheads 202. The printheads 202 within each linehead 106 are located and aligned by a support structure 206 in the illustrated embodiment. After the ink is jetted onto the print media 112, the print media 112 passes beneath the one or more dryers 108 which apply heat 208 to the ink on the print media.

Integrated imaging systems 210-1, 210-2, 210-3 are positioned after respective lineheads 106-1, 106-2, 106-3 in the illustrated embodiment. The integrated imaging systems 210 are used to detect size variations in the print media. The size variations can stretch or shrink in the length (the in-track direction) of the print media 112, stretch or shrink in the width (the cross-track direction) of the print media 112, or stretch or shrink in both the in-track and cross-track directions. The size variations can occur locally in the print media in embodiments in accordance with the invention. For example, one area of the print media can stretch while an adjacent or nearby area can shrink. Alternatively, in some embodiments, the size variation can occur over a larger area of the print media. And finally, the size variations can occur both locally and over larger areas of the print media in some embodiments in accordance with the invention.

A printing system can include any number of integrated imaging systems. Moreover, the integrated imaging systems 210 can be positioned differently in other embodiments in accordance with the invention. For example, a printing system can include two integrated imaging systems with one integrated imaging system 210-1 positioned after linehead 106-1 and another integrated imaging system 210-4 positioned after linehead 106-4.

Figure 3:
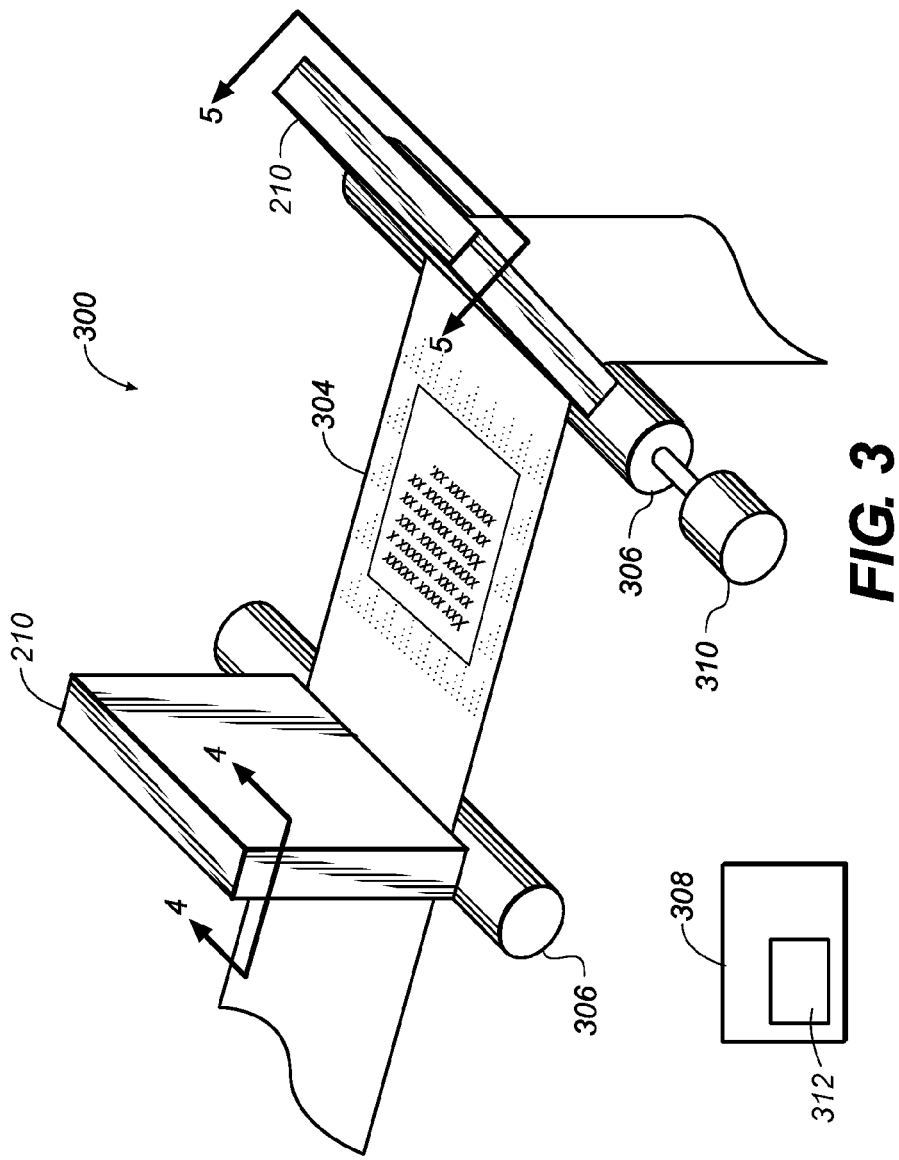
FIG. 3 illustrates one example of locations for the imaging systems 206 shown in FIG. 2.

Referring now to FIG. 3, there is shown one example of locations for the imaging systems 210 shown in FIG. 2. Printing system 300 includes one or more integrated imaging systems 210 disposed over the print media 304 at locations in the printing system 300 where the print media 304 is transported over rollers 306 in an embodiment in accordance with the invention. The print media 304 can be more stable, both in the cross-track and in-track directions when moving over the rollers 306. In other embodiments in accordance with the invention, one or more integrated imaging systems can be positioned at any location in a printing system.

The integrated imaging systems 210 are connected to an image processing device 308. Image processing device 308 can be used to process the images captured by one or more integrated imaging systems 210 or analyze the test pattern signals and, if needed, determine compensation values based on whether the print media has stretched or contracted in the in-track direction or in the cross-track direction. The integrated imaging system 210 can be connected to and transmit data to the image processing device 308 through a wired or wireless connection. The image processing device can be one or more processing devices, such as a computer or a programmable logic circuit.

Connected to the image processing device 308 is one or more storage devices 312. The storage device 312 can be used to store reference test pattern signals or reference test pattern signal values. The reference test pattern signals are described in more detail with respect to FIG. 9. The storage device 312 can be implemented as one or more external storage devices, one or more storage devices included within image processing device 308, or a combination thereof.

Motion encoder 310 can be used to produce an electronic pulse or signal proportional to a fixed amount of incremental motion of the print media in the in-track (feed) direction. The signal from motion encoder 310 can be used to trigger an image sensor (see 406 in FIG. 4) to begin scanning the moving print media. The image or pixel data can then be used to detect any size variations in the print media.

FIG. 4 is a cross-sectional view along line 4-4 in FIG. 3 in an embodiment in accordance with the invention. Integrated imaging system 210 includes light source 400, transparent cover 402, folded optical assembly 404, and image sensor 406 all enclosed within housing 410. In the illustrated embodiment, folded optical assembly 404 includes mirrors 412, 414 and lens 416. Mirrors 412, 414 can be implemented with any type of optical elements that reflects light in embodiments in accordance with the invention.

Light source 400 transmits light through transparent cover 402 and towards the surface of the print media (not shown). The light reflects off the surface of the print media and propagates through the transparent cover 402 and along the folded optical assembly 404, where mirror 412 directs the light towards mirror 414, and mirror 414 directs the light toward lens 416. The light is focused by lens 416 to form an image on image sensor 406. Image sensor 406 captures one or more images of the print media as the print media moves through the printing system by converting the reflected light into electrical signals.

Folded optical assembly 404 bends or directs the light as it is transmitted to image sensor 406 such that the optical path traveled by the light is longer than the size of integrated imaging system 210. Folded optical assembly 404 allows the integrated imaging system 216 to be constructed more compactly, reducing the weight, dimensions, and cost of the integrated imaging system. Folded optical assembly 404 can be constructed differently in other embodiments in accordance with the invention. Additional or different optical elements can be included in folded optical assembly 404.

The transparent cover 402 is disposed over an opening 401 in the housing 410. Transparent cover 402 is optional and can be omitted in other embodiments in accordance with the invention.

Integrated imaging system 210 can also include vent openings 418, 420. Vent opening 418 can be used to input air or gas while vent opening 420 can be used to output exhaust. The input air or gas can be used to maintain a clean environment and control the temperature within integrated imaging system 210. In another embodiment in accordance with the invention, integrated imaging system 210 can include one or more vent openings (e.g., vent opening 418) that input air or gas and the opening 401 in the housing 410 can be used to output exhaust.

FIG. 5 is a cross-sectional view along line 5-5 in FIG. 3 in an embodiment in accordance with the invention. As described, light source 400 transmits light through transparent cover 402 and towards the surface of the print media (not shown). The light reflects off the surface of the print media, propagates along folded optical assembly, and is directed toward lens 416. Lens 416 focuses the light to form an image on image sensor 406. Image sensor 406 can be implemented with any type of image sensor, including, but not limited to, one or more linear image sensors constructed as a charge-coupled device (CCD) image sensor or a complementary metal oxide semiconductor (CMOS) image sensor.

As discussed earlier, image sensor 406 can receive a signal from a motion encoder (e.g., 310 in FIG. 3) each time an incremental motion of the print media occurs in the feed direction. The signal from the motion encoder is used to trigger image sensor 406 to begin integrating the light reflected from the print media. In the case of a linear image sensor, the unit of incremental motion is typically configured such that an integration period begins with sufficient frequency to sample or image the print media in the feed direction with the same resolution as is produced in the cross-track direction. If the trigger occurs at a rate which produces a rate that results in sampling in the in-track (feed) direction at a higher rate, an image that is over sampled in that direction is produced and the imaged content appears elongated or stretched in the in-track direction. Conversely, a rate that is lower for the in-track direction produces imaged content that is compressed in the in-track direction.

The time period over which the integration occurs determines how much print media moves through the field of view of the imaging system. With shorter integration periods such as a millisecond or less, the motion of the print media can be minimized so that fine details in the in-track direction can be imaged. When longer integration periods are used, the light reflected off the print media is collected while the print media is moving and the motion of the print media means the printed content is blurred in the direction of motion. The blurring in the direction of motion has the effect of averaging the pixel data in one direction, the in-track (feed) direction. Averaging the pixel data through blurring is also known as optical averaging. By performing the averaging optically with longer integration periods, the amount of data that is transferred to and processed by a processing device (e.g., 308 in FIG. 3) is reduced.

In one embodiment in accordance with the invention, the integration time period is based on the length of the test pattern that has the highest number of marks. The image sensor is repeatedly turned on for a known time period and then turned off. A test pattern signal is produced for each test pattern where the amplitude of each test pattern signal represents the number of marks scanned by the image sensor. By way of example only, the amplitudes of the test pattern signals can be used to determine whether the print media has stretched or shrunk in the in-track direction. The distances between the test pattern signals can be used to determine whether the print media has stretched or shrunk in the cross-track direction.

Figure 6:
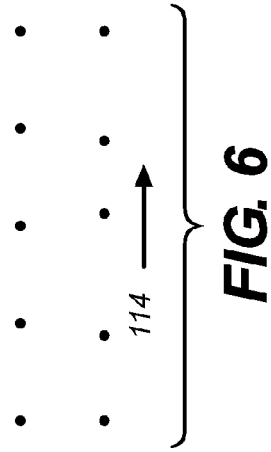
FIG. 6 depicts an example of a test pattern in an embodiment in accordance with the invention.

Referring now to FIG. 6, there is shown one example of a set of test patterns on a print media in an embodiment in accordance with the invention. Each test pattern includes one or more marks. The marks can be printed such as dots, polygons, or lines. Alternatively, the marks can be formed in or on the print media, such as dimples or raised lines. The set of test pattern repeats over a portion of the print media in an embodiment in accordance with the invention.

In the illustrated embodiment, each test pattern in the set of test patterns has a unique number of marks, in that a number of marks in one test pattern differs from the number of marks in the other test patterns in the set. Other embodiments in accordance with the invention can configure the test patterns differently. By way of example only, a set of test patterns can include multiple test patterns with every two adjacent test patterns having a different number of marks.

In one embodiment in accordance with the invention, the test patterns are implemented as non-objectionable test patterns. A non-objectionable test pattern forms a pattern, shape, or design that is not significantly discernable by the human vision system or intelligence but can be detected by an imaging system (e.g., see 210 in FIGS. 3-5). The marks included in each test pattern can be regularly or irregularly spaced so long as they appear non-objectionable. In the illustrated embodiment the marks are implemented as dots. The dots can also be of various diameters, so as to be small enough to be non-objectionable, but large enough to be detectable by the imaging system.

Figure 7:
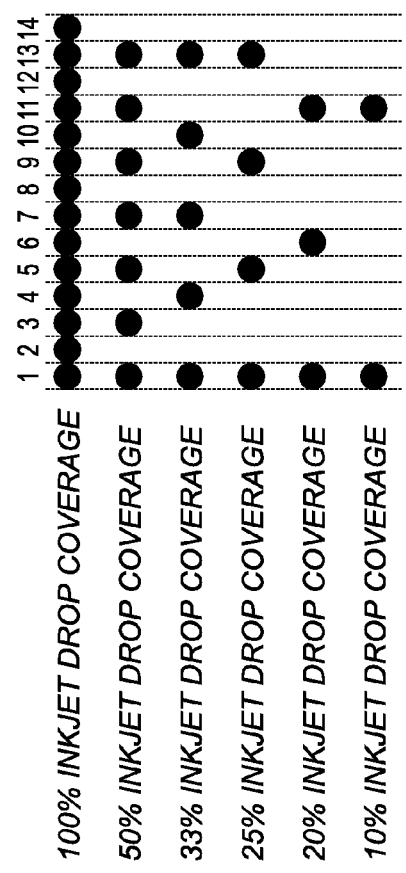
FIG. 7 illustrates examples of different ink drop coverage in an embodiment in accordance with the invention.

Referring now to FIG. 7, there is shown examples of different ink drop coverage in an embodiment in accordance with the invention. The marks in the test patterns can be spaced relatively close or far from each other. When the marks are spaced farther apart, such as with the 20% or 10% inkjet drop coverage, the drop coverage is low. In general, test marks produced at the lower inkjet drop coverage are less objectionable but can be more difficult to detect by the imaging system.

Figure 8B:
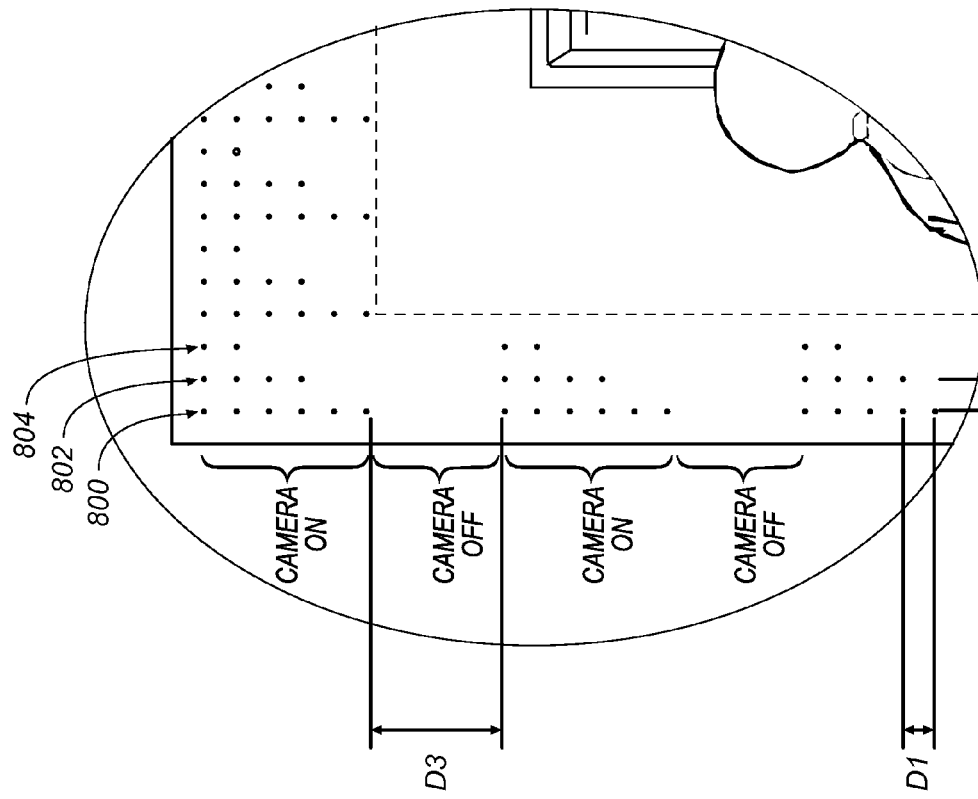
FIGS. 8A-8B depict examples of content to be printed on a print media and test patterns on the print media in an embodiment in accordance with the invention.
Figure 8A:
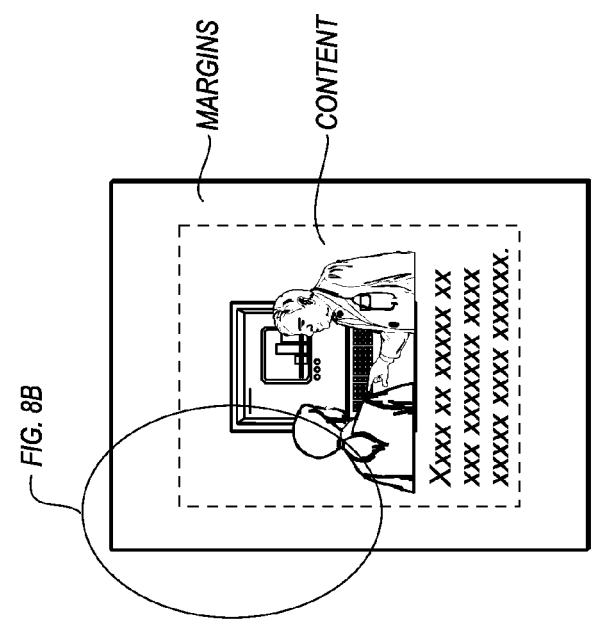

FIGS. 8A-8B depict examples of content to be printed on a print media and test patterns on the print media in an embodiment in accordance with the invention. The content area is an area on the print media where published information such as text, images, animation, and graphics will be printed on the print media. In FIG. 8A, the content to be printed includes both text (indicated by the xx's) and graphics.

The content area is surrounded by a margin of print media where published information is not printed. An enlarged portion of the margin is shown in FIG. 8B. Included in the margin is a repeating set of test patterns that will be printed, or are pre-printed or formed on the print media. Each test pattern has a known number of marks. The marks in each pattern are spaced a known distance apart (D1) and each pattern is spaced a known distance apart (D2) from the adjacent pattern or patterns. Additionally, the distance (D3) between the test patterns is a known distance.

In the illustrated embodiment, the test patterns 800, 802, 804 are formed both along the top section of the margin extending across the width of the print media and down along the left-side portion of the margin extending down the length of the print media. Test pattern 800 includes six dots, test pattern 802 four dots, and test pattern 804 two dots. Other embodiments can include a different number or arrangement of test patterns.

As indicated in FIG. 8B, one technique for analyzing the test patterns to determine if the print media has stretched or shrunk is to turn on the image sensor for a known period of time so that the image sensor can scan one or more images of the test patterns 800, 802, 804 as the print media passes the imaging system. In the illustrated embodiment, the known time period is associated with test pattern 800, the test pattern with the highest number of dots. The image sensor is then turned off for the time period associated with the distance D3. The image sensor is then repeatedly turned on and off while the content is imaged from the print media. The image sensor can be turned on and off for every row of test patterns, at regular time intervals, or at selected times. The captured images of the test patterns are processed to determine whether any portion(s) of the print media has experienced size variations.

In other embodiments in accordance with the invention, the test patterns can be disposed both within the content area and the margin, or the test patterns can be formed only within the content area. The test patterns disposed within the content area are implemented as non-objectionable test patterns. The test patterns formed within the margin can be configured as non-objectionable or as visible test patterns.

Figure 9:
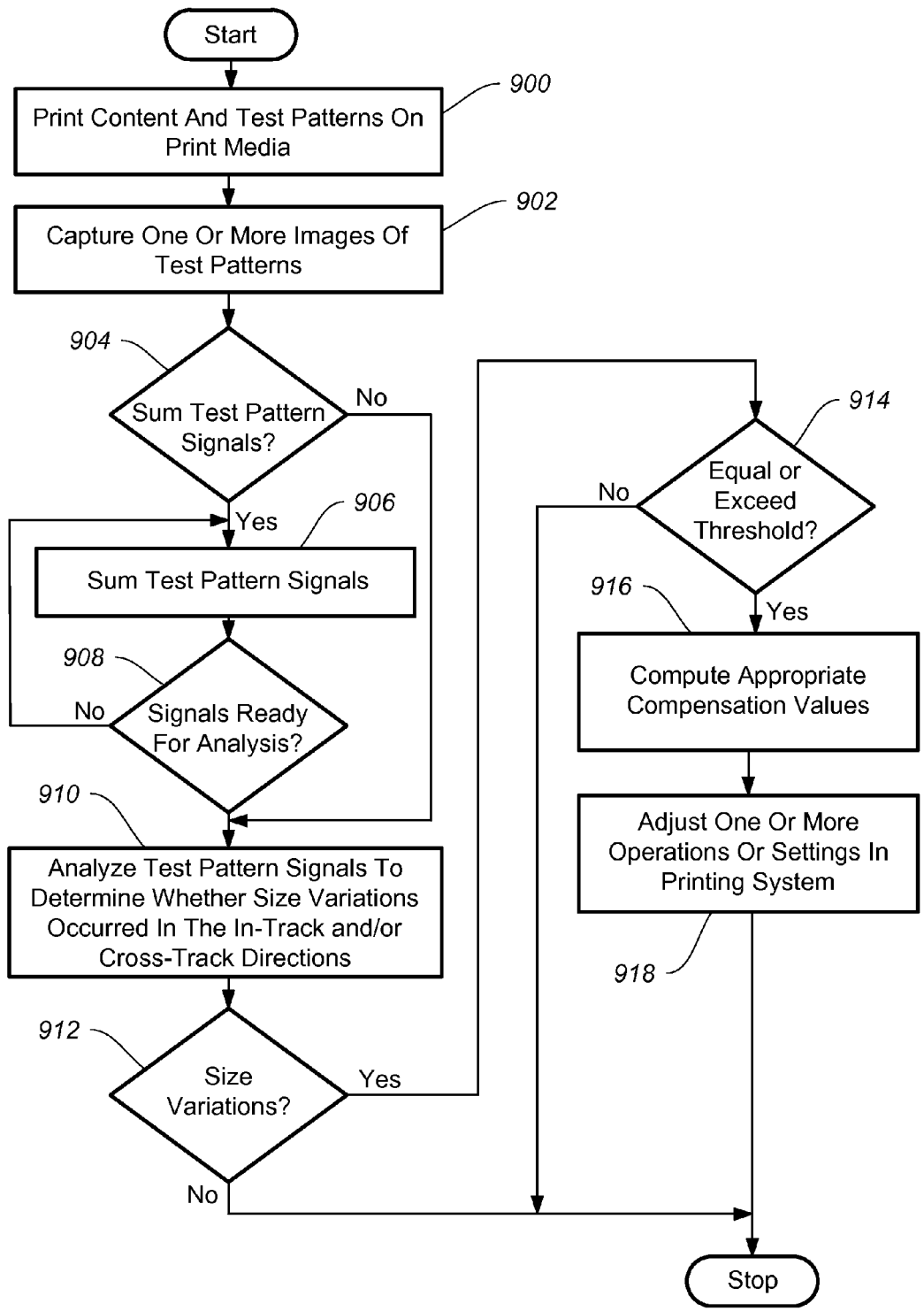
FIG. 9 is a flowchart of a method for detecting size variations in a moving print media in an embodiment in accordance with the invention.

The images of the test patterns are converted to a digital representation of the print media suitable for analysis in a computer or processing device, such as, for example, processing device 308 (see FIG. 3). Referring now to FIG. 9, there is shown a method for detecting size variations in a moving print media in an embodiment in accordance with the invention. Initially, both the content and the test patterns are printed on a print media (block 900). In another embodiment, the test patterns can be pre-printed or pre-formed prior to printing the content on the print media. As described earlier, each test pattern includes one or more marks. The marks can include printed dots, polygons, or lines. Alternatively, the marks can be formed in or on the print media, such as dimples or raised lines.

Next, as shown in block 902, the print media is scanned and one or more images of the test patterns are captured. A determination is made at block 904 as to whether or not the test pattern signals representing the imaged test patterns are to be summed. If the test pattern signals are to be summed, the method passes to block 906 where the signals are summed for a known period of time.

A determination is then made at block 908 as to whether or not the summed test pattern signals are ready for analysis. For example, the test pattern signals can be analyzed to determine whether the test pattern signals have sufficient amplitude or strength for analysis. If the test pattern signals are not ready for analysis, the process returns to block 904 and the test pattern signals are summed until the signals are ready for analysis.

Figure 10:
FIG. 10 illustrates one example of the summing of a signal from a test pattern in an embodiment in accordance with the invention.

FIG. 10 illustrates one example of the summing of a signal from a test pattern in an embodiment in accordance with the invention. The signal representing the test pattern has a first amplitude 1000 after an image of the test pattern is analyzed. After the second page, the signal representing the sum of the test pattern on the first and second pages has a higher second amplitude 1002. And after the third page, the signal representing the sum of the test pattern on the first, second, and third pages has a yet higher third amplitude 1004. In this way, a signal of sufficient intensity is obtained for the image processing device (e.g., 308 in FIG. 3) to process.

Returning to blocks 910 and 912 in FIG. 9, the measured test pattern signals are then analyzed to determine whether size variations have occurred in the in-track direction, the cross-track direction, or both the in-track and cross-track directions. For example, the measured test pattern signals can be compared with reference test pattern signals to determine whether size variations have occurred in the print media in the in-track direction and in the cross-track direction. A difference between the measured test pattern signals and the reference test pattern signals can indicate size variations.

In another embodiment in accordance with the invention, the distance between two measured test pattern signals can be used to determine whether size variations in the print media have occurred in the cross-track direction. And in yet another embodiment, the amplitude difference between two adjacent measured test pattern signals in the same measured test pattern can be used to determine size variations in the print media have occurred in the in-track direction.

If size variations have occurred, a determination is then made at block 914 as to whether or not the size variation or variations equals or exceeds a threshold value. The threshold values can be stored in a storage device (e.g., 312 in FIG. 3). Those skilled in the art will recognize that the threshold values can be updated during a print job to optimize the threshold values for the print job.

If the size variation or variations equal or exceed the threshold value(s), appropriate compensation values are then computed at block 916 based on whether the size variations occurred in the in-track direction, the cross-track direction, or both the in-track and cross-track directions. One or more operations or settings of the printing system can be adjusted based on the compensation values (block 918). For example, the times at which ink drops are ejected can be modified, or the speed of the print media can be changed to compensate for the size variations.

Other embodiments in accordance with the invention can modify, delete, or add blocks to the embodiment shown in FIG. 9. For example, block 914 can be omitted in another embodiment. Alternatively, blocks 904, 906 and 908 can be deleted in other embodiments in accordance with the invention.

Figure 11A:
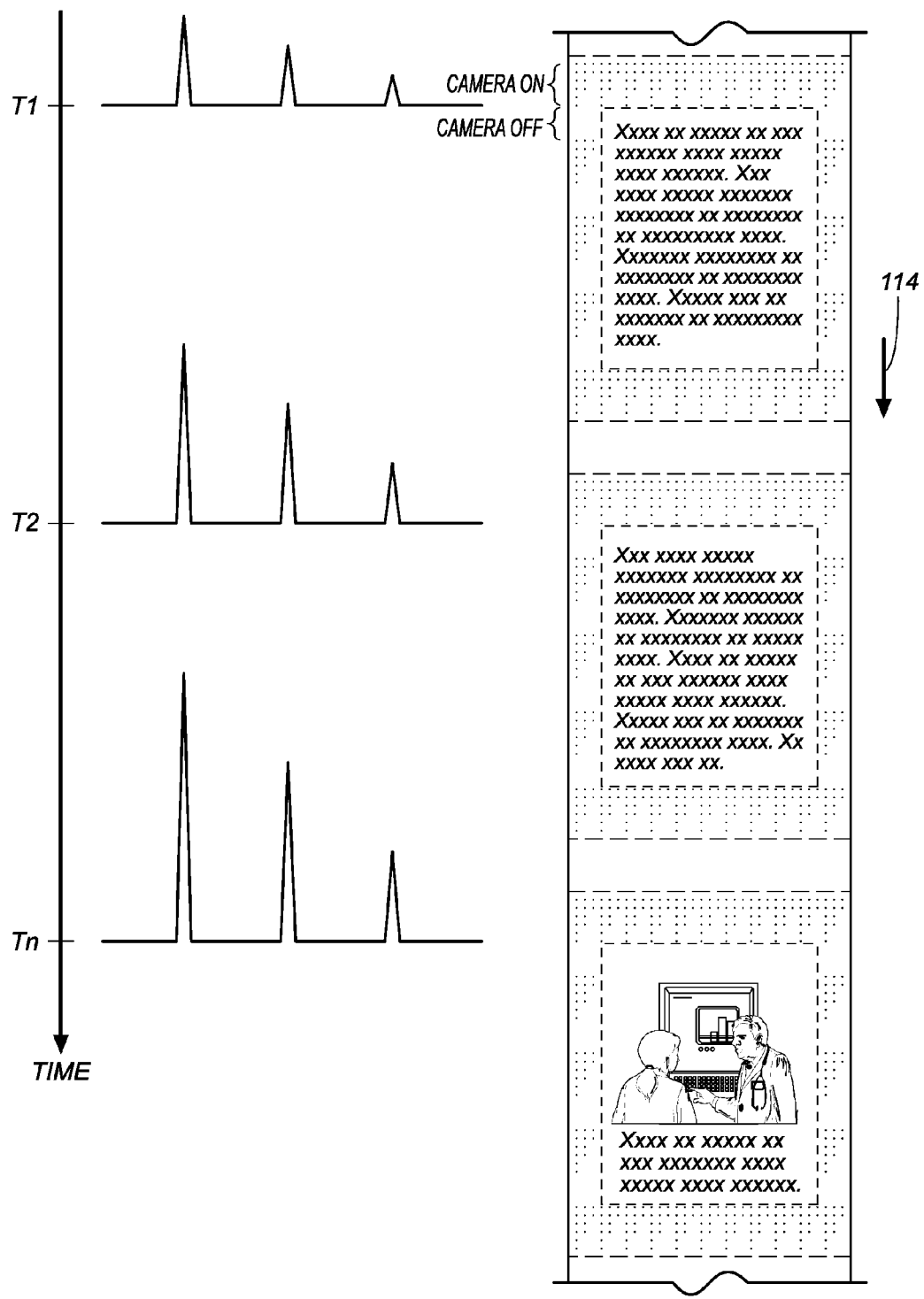

Referring now to FIGS. 11A-11C, there is shown examples of test patterns on a print media and reference and measured signals in an embodiment in accordance with the invention. FIG. 11A illustrates three test pattern signals at time T1, time T2, and time Tn. In the illustrated embodiment, the test pattern signals are summed over this time period while the camera is turned on and off as the print media moves through the printing system. As discussed earlier, a higher or stronger signal is captured for image processing the more times the same test pattern signal is summed.

FIG. 11B depicts different test patterns and measured test pattern signals and how the signals can be used to determine whether stretch or shrink has occurred in the cross-track direction. The top set of patterns and signals represents the expected or known test patterns and test pattern signals 1100. The test pattern signals 1100 can be used as reference test pattern signals in an embodiment in accordance with the invention. The test patterns are separated by a known distance X. The distance between the test patterns increases, as does the distance between the measured test pattern signals 1102, when the print media stretches in the cross-track direction. The test patterns and measured test pattern signals are separated by a distance X+Δ (see middle illustration in FIG. 11B). The increased distance (+Δ) between test pattern signals can be used to determine stretch in the cross-track direction, and the determination of any compensation values can be based on the magnitude of the increased distance.

When the print media shrinks in the cross-track dimension, the test patterns and the measured test pattern signals 1104 are closer together and are separated by a measured distance X−Δ (see bottom illustration in FIG. 11B). The decreased distance (−Δ) between test pattern signals can be used to determine shrink in the cross-track direction, and the determination of any compensation values can be based on the magnitude of the decreased distance.

FIG. 11C illustrates different test patterns and measured test pattern signals and how the signals can be used to determine whether stretch has occurred in the in-track direction. The top set of patterns and signals represents the expected or known test patterns and test pattern signals 1112. The marks in each test pattern are separated from an adjacent mark within the same test pattern by a known distance Y. The test pattern signals 1112 can be used as reference test pattern signals in an embodiment in accordance with the invention.

During the time an image sensor or camera is turned on, the image sensor scans six marks in test pattern 1106, four marks in test pattern 1108, and two marks in test pattern 1110. The measured test pattern signals 1112 each have different amplitudes. The test pattern signal with the highest amplitude is associated with test pattern 1106, the test pattern that had the highest number of marks scanned. The test pattern signal with the lowest amplitude is associated with test pattern 1110, the test pattern that had the least number of marks scanned. And the test pattern signal with an intermediate amplitude (between the highest and lowest amplitudes) is associated with test pattern 1108, the test pattern that had four marks scanned.

When the print media stretches in the in-track direction, the marks in the test patterns are spaced farther apart and are separated by a measured distance Y+Δ (see bottom illustration in FIG. 11C). During the time an image sensor or camera is turned on, the image sensor scans four marks in test pattern 1106, four marks in test pattern 1108, and two marks in test pattern 1110. As a result, the amplitude of the test pattern signal associated with test pattern 1106 is less or smaller compared to the reference amplitude of the test pattern signal for test pattern 1106. The determination of any compensation values can be based on the difference between the amplitude of the reference test pattern signal and the amplitude of the measured test pattern signal.

Although not shown in FIG. 11C, those skilled in the art will recognize that when the print media shrinks in the in-track direction, the marks in the test patterns are closer together and are separated by a measured distance Y−Δ. The amplitude of one or more test pattern signals will be greater or higher compared to the amplitude of the respective reference test pattern signal.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. A method for detecting size variations in a moving print media can include (a) capturing an image of test patterns each test pattern having one or more marks formed or printed on the print media as the print media is moving in a transport direction to produce test pattern signals each representing a respective test pattern; (b) analyzing the measured test pattern signals to determine whether a size variation has occurred in the print media; (c) determining one or more compensation values based on the size variation; and (d) adjusting operation of a printing system based on the one or more compensation values.

2. The method in clause 1 can include prior to performing (c), determining whether the size variation equals or exceeds a threshold value, and if the size variation equals or exceeds the threshold value, performing (c).

3. The method in clause 1 or clause 2 can include repeating (a)-(d) a given number of times.

4. The method in clause 3 can include summing respective test pattern signals to produce summed test pattern signals.

5. The method as in any one of clauses 1-4, where analyzing the measured test pattern signals to determine whether a size variation has occurred in the print media includes determining a distance between each test pattern signal to determine whether a size variation has occurred in the print media in the cross-track direction.

6. The method as in any one of clauses 1-4, where analyzing the measured test pattern signals to determine whether a size variation has occurred in the print media comprises determining an amplitude of each test pattern signal to determine whether a size variation has occurred in the print media in the in-track direction.

7. The method as in any one of clauses 1-4, wherein analyzing the measured test pattern signals to determine whether a size variation has occurred in the print media comprises comparing the measured test pattern signals with reference test pattern signals to determine whether a size variation has occurred in the print media.

8. The method as in any one of clauses 1-7, where the test patterns include non-objectionable test patterns printed or formed on the print media.

9. The method in clause 8 can include printing content and the non-objectionable test patterns on the print media prior to capturing an image of the test patterns.

10. The method as in clause 9, where the non-objectionable test patterns are printed within a content area that includes the content.

11. The method as in clause 9, where the test patterns are printed in an margin or margins around a content area that includes the content.

12. The method as in any one of clauses 1-11, where a number of marks in one test pattern differs from a number of marks in the other test patterns.

13. A printing system can include: a print media; one or more non-objectionable test patterns formed or printed on the print media; and an integrated imaging system. The integrated imaging system can include a housing an opening in the housing for receiving light reflected from a moving print media; a folded optical assembly in the housing that receives the reflected light and transmits the light a predetermined distance; and an image sensor within the housing that receives the light and captures one or more images of the non-objectionable test pattern.

14. The printing system in clause 13 can include a storage device for storing one or more reference test pattern signals.

15. The printing system in clause 14 can include a processing device for processing the one or more images of the one or more non-objectionable test patterns to produce a test pattern signal for each non-objectionable test pattern and for comparing at least one test pattern signal to a respective reference test pattern signal.

16. The printing system in clause 13 can include a processing device for processing the one or more images of the one or more non-objectionable test patterns to produce a test pattern signal for each non-objectionable test pattern and for analyzing at least one test pattern signal to detect a size variation in the print media.

17. The printing system in any one of clauses 13-16 can include at least two vent openings in the housing, with one vent opening for inputting air or gas and one vent opening for outputting exhaust.

18. The printing system in any one of clauses 13-16 can include a vent opening in the housing for receiving air or gas.

19. The printing system as in clause 18, where the opening in the housing is used to output exhaust.

20. The printing system in any one of clauses 13-19 can include a light source for emitting light towards the print media.

21. The printing system in any one of clauses 13-20 can include a roller for transporting the print media through the printing system.

22. The printing system in clause 21 can include a motion encoder connected to the roller, wherein the motion encoder is adapted to output a signal proportional to a fixed amount of incremental motion of the print media.

23. The printing system as in clause 21 or clause 22, where the integrated imaging system is disposed over the print media at a location where the print media is transported over the roller.

PARTS LIST 100 printing system
102 printing module
104 printing module
106 linehead
108 dryer
110 quality control sensor
112 print media
114 transport direction
116 turnover module
200 printing system
202 printhead
204 nozzle array
206 support structure
208 heat
210 integrated imaging system
300 printing system
304 print media
306 roller
308 image processing device
310 motion encoder
312 storage device
400 light source
401 opening in housing
402 transparent cover
404 folded optical assembly
406 image sensor
410 housing
412 mirror
414 mirror
416 lens
418 vent
420 vent
800 test pattern
802 test pattern
804 test pattern
900-916 blocks
1000 first amplitude
1002 second amplitude
1004 third amplitude
1100 test pattern signals
1102 test pattern signals
1104 test pattern signals
1106 test pattern signals
1108 test pattern signals
D1 distance
D2 distance
D3 distance

The invention claimed is:

1. A printing system comprising:
a print media;
one or more non-objectionable test patterns formed or printed on the print media;
an integrated imaging system, comprising:
a housing;
an opening in the housing for receiving light reflected from the moving print media;
a folded optical assembly in the housing that receives the reflected light and transmits the light a predetermined distance; and
an image sensor within the housing that receives the light and captures one or more images of the one or more non-objectionable test patterns;
a storage device for storing one or more reference test pattern signals; and
a processor for producing a test pattern signal for each of the one or more non-objectionable test patterns formed or printed on the print media, for comparing each test pattern signal to a respective one of the one or more reference test pattern signals to determine whether a size variation has occurred in the print media, for determining compensation values in response to the size variation in the print media, and for using the compensation values to adjust the operational settings for the printing system.

2. The printing system as in claim 1, further comprising at least two vent openings in the housing, one vent opening for inputting air or gas and one vent opening for outputting exhaust.

3. The printing system as in claim 1, further comprising a light source for emitting light towards the print media.

4. The printing system as in claim 1, further comprising a roller for transporting the print media through the printing system.

5. The printing system as in claim 4, further comprising a motion encoder connected to the roller, wherein the motion encoder is adapted to output a signal proportional to a fixed amount of incremental motion of the print media.

6. The printing system as in claim 4, wherein the integrated imaging system is disposed over the print media at a location where the print media is transported over the roller.

7. The printing system as in claim 1, further comprising a vent opening in the housing for receiving air or gas.

8. The printing system as in claim 7, wherein the opening in the housing is used to output exhaust.

* * * * *